(12) United States Patent
Abe et al.

(10) Patent No.: US 8,514,330 B2
(45) Date of Patent: Aug. 20, 2013

(54) COMMUNICATION APPARATUS AND CONTROL METHOD

(75) Inventors: Isao Abe, Kawasaki (JP); Tatsuya Kimoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 379 days.

(21) Appl. No.: 12/631,718

(22) Filed: Dec. 4, 2009

(65) Prior Publication Data

US 2010/0165198 A1    Jul. 1, 2010

(30) Foreign Application Priority Data

Dec. 25, 2008    (JP) ................... 2008-330363

(51) Int. Cl.
- *H04N 5/46* (2006.01)
- *H04N 5/50* (2006.01)
- *H04N 7/16* (2006.01)
- *G06F 3/12* (2006.01)

(52) U.S. Cl.
USPC ........... 348/558; 348/569; 725/139; 358/1.15

(58) Field of Classification Search
None
See application file for complete search history.

(56) References Cited

U.S. PATENT DOCUMENTS

| 8,073,311 B2 | 12/2011 | Takamori | |
| 2007/0070402 A1* | 3/2007 | Kitayama et al. | 358/1.15 |
| 2008/0050097 A1 | 2/2008 | Takamori | |
| 2008/0151119 A1* | 6/2008 | Suzuki | 348/569 |
| 2008/0155639 A1* | 6/2008 | Miyagi | 725/139 |
| 2009/0027554 A1* | 1/2009 | Noh | 348/558 |

FOREIGN PATENT DOCUMENTS

| JP | 2007-078980A A | 3/2007 |
| JP | 2008-052776A A | 3/2008 |
| JP | 2008-160653 A | 7/2008 |
| JP | 2008-276067A A | 11/2008 |

* cited by examiner

*Primary Examiner* — Jefferey Harold
*Assistant Examiner* — Sean Haiem
(74) *Attorney, Agent, or Firm* — Canon USA Inc. IP Division

(57) ABSTRACT

A communication apparatus includes a first determination unit that determines whether an external apparatus can transmit device information of the external apparatus to the communication apparatus, a device information acquisition unit that acquires the device information from the external apparatus even when the first determination unit determines that the external apparatus cannot transmit device information of the external apparatus to the communication apparatus, a second determination unit that determines whether the device information acquired from the external apparatus is correct, and a communication unit that transmits video data corresponding to the device information to the external apparatus if the second determination unit determines that the device information is correct even when the first determination unit determines that the external apparatus cannot transmit device information of the external apparatus to the communication apparatus.

20 Claims, 3 Drawing Sheets

COMMUNICATION APPARATUS AND CONTROL METHOD

BACKGROUND OF THE INVENTION

1. Field of the Invention

The present invention relates to a communication apparatus that communicates with an external apparatus, and a control method of the communication apparatus.

2. Description of the Related Art

Currently, there is a communication system which complies with high definition multimedia interface (HDMI) (registered trademark) standard (hereinafter referred to as an HDMI system). The HDMI system includes a source apparatus which transmits video data and a sink apparatus which displays the video data received from the source apparatus.

The sink apparatus stores extended display identification data (EDID). EDID is device information of the sink apparatus and includes information about the display capability of the sink apparatus. Japanese Patent Application Laid-Open No. 2008-160653 discusses a source apparatus that can determine a video format appropriate for the display capability of the sink apparatus by referring to the EDID acquired from the sink apparatus.

If there is an error in a cable connection between the source apparatus and the sink apparatus, a transmission error or a loss of the EDID may occur when the EDID is being transmitted from the sink apparatus to the source apparatus. For example, such transmission error or loss of the EDID may occur when chattering is generated, thereby deteriorating the EDID being transmitted. In such a case, the source apparatus may not be able to acquire the correct EDID from the sink apparatus. As a result, the source apparatus cannot recognize the video format appropriate for the display capability of the sink apparatus and thus cannot transmit the appropriate video data to the sink apparatus.

The above described issue may also occur in a communication system other than the HDMI system. For example, the problem may occur in a communication system that recognizes the video format appropriate for the display capability of the external apparatus (i.e., the sink apparatus) by the communication apparatus (i.e., the source apparatus) referring to the device information acquired from the external apparatus.

SUMMARY OF THE INVENTION

The present invention is directed to enabling transmission to the external apparatus the video data appropriate for the display capability of the external apparatus.

According to an aspect of the present invention, a communication apparatus includes a first determination unit that determines whether an external apparatus can transmit device information of the external apparatus to the communication apparatus, a device information acquisition unit that acquires the device information from the external apparatus even when the first determination unit determines that the external apparatus cannot transmit device information of the external apparatus to the communication apparatus, a second determination unit that determines whether the device information acquired from the external apparatus is correct, and a communication unit that transmits video data corresponding to the device information to the external apparatus, if the second determination unit determines that the device information is correct even when the first determination unit determines that the external apparatus cannot transmit device information of the external apparatus to the communication apparatus.

According to another aspect of the present invention, a method of controlling a communication apparatus includes determining whether an external apparatus can transmit device information of the external apparatus to the communication apparatus, acquiring the device information from the external apparatus even when it is determined that the external apparatus cannot transmit device information of the external apparatus to the communication apparatus, determining whether the device information acquired from the external apparatus is correct, and transmitting video data corresponding to the device information to the external apparatus if it is determined that the device information is correct even when it is determined that the external apparatus cannot transmit device information of the external apparatus to the communication apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
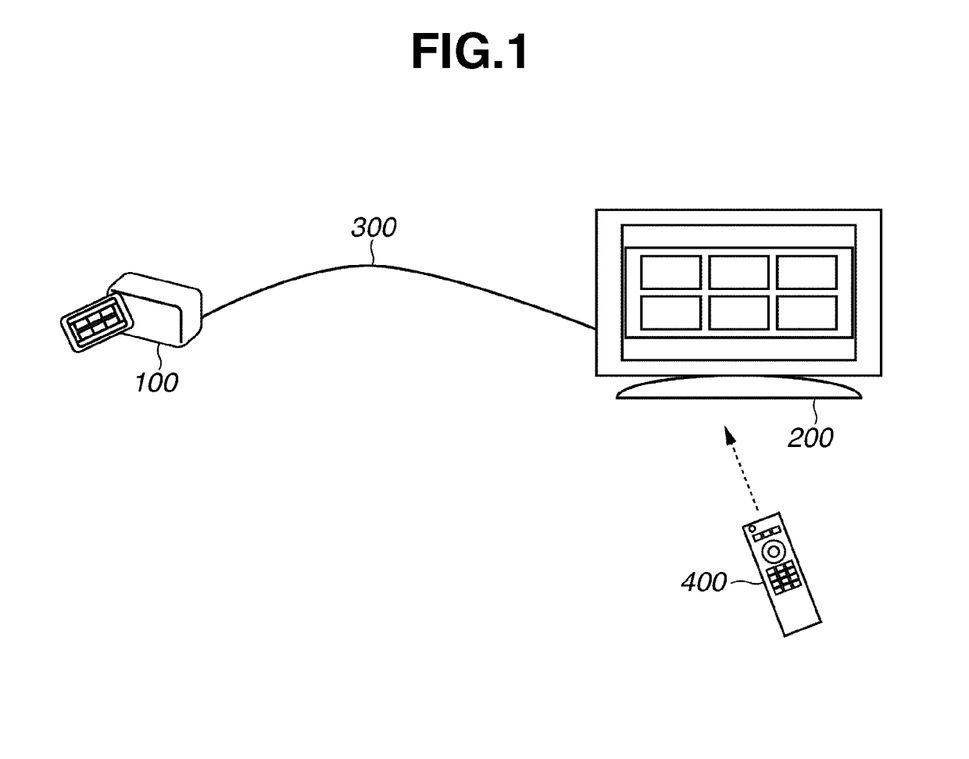
FIG. 1 illustrates an example of a communication system according to a first exemplary embodiment of the present invention.
Figure 2:
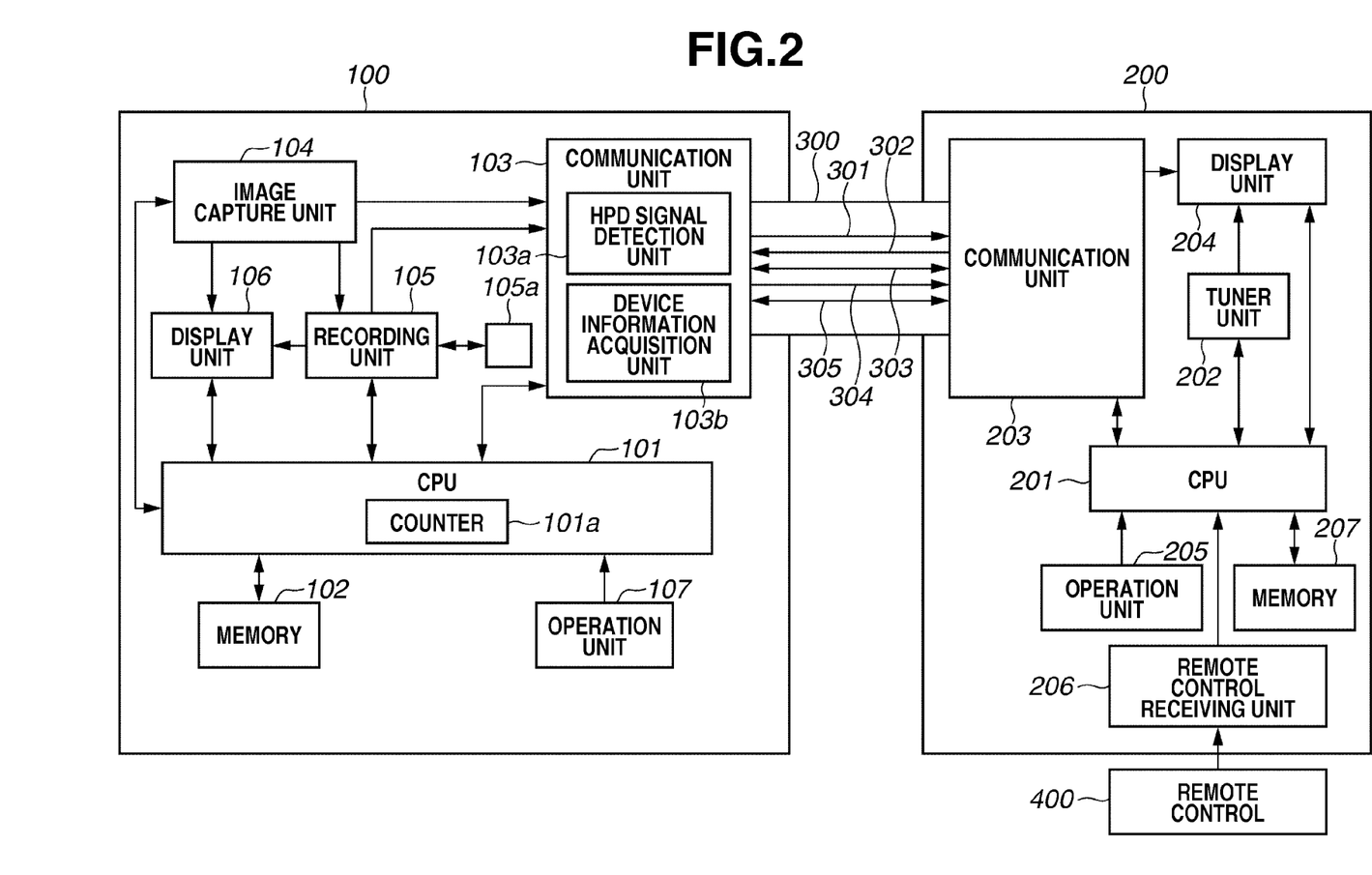
FIG. 2 is a block diagram illustrating an example of a configuration of a communication apparatus and an external apparatus according to the first exemplary embodiment of the present invention.

FIG. 1 illustrates an example of a communication system according to the first exemplary embodiment of the present invention. FIG. 2 is a block diagram illustrating an example of a configuration of the communication apparatus 100 and the external apparatus 200 according to the first exemplary embodiment of the present invention.

Referring to FIGS. 1 and 2, the communication system according to the first exemplary embodiment includes the communication apparatus 100, the external apparatus 200, a connection cable 300, and a remote control 400. The communication apparatus 100 and the external apparatus 200 are connected via a connection cable 300.

The communication apparatus 100 is a video output apparatus that can transmit the video data, audio data, and auxiliary data to the external apparatus 200 via the connection cable 300. The external apparatus 200 is a display apparatus that displays on a display device the video data received from the communication apparatus 100. The communication apparatus 100 and the external apparatus 200 can both bi-directionally transmit various control commands via the connection cable 300.

The remote control 400 provides a user with a user interface for operating the communication apparatus 100 and the external apparatus 200. The remote control 400 can transmit to the external apparatus 200 via wireless communication a control signal for controlling at least one of the communication apparatus 100 and the external apparatus 200. Upon receiving the control signal transmitted from the remote control 400, the external apparatus 200 analyzes the received control signal. If the received control signal is a signal for controlling the external apparatus 200, the external apparatus 200 controls the external apparatus 200 according to the received control signal. On the other hand, if the received control signal is a signal for controlling the communication apparatus 100, the external apparatus 200 generates a control command corresponding to the control signal received from the remote control 400. The external apparatus 200 then transmits the generated control command to the communication apparatus 100 via the connection cable 300. As a result, the user can remotely control at least one of the external apparatus 200 and the communication apparatus 100 using the remote control 400.

In the first exemplary embodiment, the communication apparatus 100, the external apparatus 200, and the connection cable 300 comply with the HDMI standard and digital visual interface (DVI) standard. The communication apparatus 100 is thus a source apparatus that functions as a HDMI source according to the HDMI standard, and the external apparatus 200 is a sink apparatus that functions as a HDMI sink according to the HDMI standard.

Further, in the first exemplary embodiment, the communication apparatus 100 and the external apparatus 200 comply with consumer electronics control (CEC) protocol defined in the HDMI standard. The control command bi-directionally transmitted between the communication apparatus 100 and the external apparatus 200 thus complies with the CEC protocol. Hereinafter, the control command complying with the CEC protocol will be referred to as a CEC command.

A video camera will be used as an example of the communication apparatus 100 in the first exemplary embodiment. However, the communication apparatus 100 is not limited to the video camera, and video output apparatuses such as a still camera, video recorder, and a computer can also be used as the communication apparatus 100.

Further, a television (hereinafter referred to as TV) will be used as an example of the external apparatus 200. However, the external apparatus 200 is not limited to the TV, and display apparatuses such as a projector can also be used as the external apparatus 200.

Hereinafter, the communication apparatus 100 will be referred to as a video camera 100, the external apparatus 200 as a TV 200, and the connection cable 300 as an HDMI cable 300.

The HDMI cable 300 will be described below with reference to FIG. 2.

The HDMI cable 300 includes a +5 V power line 301, a hot plug detect (HPD) line 302, and a display data channel (DDC) line 303. Further, the HDMI cable 300 includes a transition minimized differential signaling (TMDS) line 304, and a CEC line 305.

The +5 V power line 301 is a power supply line for supplying +5 V from the video camera 100 to the TV 200.

The HPD line 302 (i.e., a first transmission line) is the transmission line for transmitting from the TV 200 to the video camera 100 a high voltage level (hereinafter referred to as H level) or a low voltage level (hereinafter referred to as L level) HPD signal.

When the video camera 100 supplies +5 V to the TV 200 via the +5 V power line 301, the TV 200 determines whether the EDID or an enhanced EDID (E-EDID) of the TV 200 can be transmitted to the video camera 100.

Both the EDID and the E-EDID are device information of the TV 200 and include information about the TV 200 such as the display capability of the TV 200. For example, the EDID and the E-EDID include information about resolution, scanning frequency, aspect ratio, and color space supported by the TV 200. E-EDID is an extension of the EDID and includes more capability information as compared to the EDID, such as information about the video data format and the audio data format supported by the TV 200. Hereinafter, both the EDID and the E-EDID will be referred to as EDID.

If the video camera 100 is supplying +5 V to the TV 200 and the TV 200 can transmit the EDID of the TV 200 to the video camera 100, the TV 200 transmits the H level HPD signal to the video camera 100 via the HPD line 302. As a result, the TV 200 can inform the video camera 100 that the TV 200 and the video camera 100 have been connected.

On the other hand, if the TV 200 cannot transmit the EDID of the TV 200 to the video camera 100 even when the video camera 100 is supplying +5 V to the TV 200, the TV 200 transmits the L level HPD signal to the video camera 100 via the HPD line 302. The TV 200 also transmits the L level HPD signal to the video camera 100 via the HPD line 302 when the video camera is not supplying +5 V to the TV 200.

The DDC line 303 (i.e., a second transmission line) is the transmission line for transmitting the EDID of the TV 200 from the TV 200 to the video camera 100. The video camera 100 receiving the EDID of the TV 200 can automatically recognize the display capability and the audio capability of the TV 200 by referring to the EDID of the TV 200. Further, a central processing unit (CPU) 101 can automatically recognize the video format and the audio format appropriate for the display capability and the audio capability of the TV 200. By specifying a setting of the video camera 100 to be appropriate for the TV 200, the video camera 100 can convert the video data and the audio data transmitted from the TV 200 to the video camera 100 to video data and audio data that are appropriate for the capability of the TV 200.

The TMDS line 304 is the transmission line for transmitting the video data, the audio data, and the auxiliary data from the video camera 100 to the TV 200. The TMDS line 304 includes a TMDS channel 0, a TMDS channel 1, a TMDS channel 2, and a TMDS clock channel.

The CEC line 305 is the transmission line for bi-directionally transmitting various CEC commands between the video camera 100 and the TV 200. The TV 200 transmits the CEC command for controlling the video camera 100 to the video camera 100 via the CEC line 305. As a result, the TV 200 can control the video camera 100. The video camera 100 also transmits the CEC command for controlling the TV 200 to the TV 200 via the CEC line 305. The video camera 100 can thus control the TV 200. The CEC commands for controlling the video camera 100 related to a power supply of the video camera 100 include a power on command and a power off command. Other CEC commands for controlling the video camera 100 are reproduce command, stop command, pause command, fast forward command, rewind command, record command, temporarily stop recording command, menu on command, and menu off command.

An example of a configuration of the video camera 100 will be described below with reference to FIG. 2.

Referring to FIG. 2, the video camera 100 includes the CPU 101, a memory 102, a communication unit 103, an image capture unit 104, a recording unit 105, a display unit 106, and an operation unit 107.

The CPU 101 controls the overall operation of the video camera 100 according to a computer program stored in the memory 102. The CPU 101 can also control the overall operation of the video camera 100 using the EDID of the TV 200.

The CPU 101 includes a counter 101a for counting a count value N. The count value N is a value indicating the number of times video camera 100 reacquired the EDID of the TV 200. Further, the count value N is a value indicating the number of times the video camera 100 received an incorrect EDID from the TV 200.

The communication unit 103 includes an HDMI terminal for connecting the HDMI cable 300. If an operation mode of the video camera 100 is an image capture mode, the communication unit 103 transmits to the TV 200 via the TMDS line 304 the video data generated by the image capture unit 104 and the audio data generated by a microphone unit (not illustrated). In such a case, the auxiliary data generated by the CPU 101 is also transmitted to the TV 200 via the TMDS line 304. On the other hand, if the operation mode of the video camera 100 is a playback mode, the communication unit 103 can transmit to the TV 200 via the TMDS line 304 the video data and the audio data that the recording unit 105 reproduces from a recording medium 105a. In such a case, the auxiliary data generated by the CPU 101 is also transmitted to the TV 200 via the TMDS line 304.

Further, the communication unit 103 can receive the CEC command transmitted from the TV 200 via the CEC line 305. The CEC command received from the TV 200 is supplied by the communication unit 103 to the CPU 101. The CPU 101 can then control the video camera 100 according to the CEC command received from the TV 200. The communication unit 103 can also transmit the CEC command for controlling the TV 200 to the TV 200 via the CEC line 305. The CEC command for controlling the TV 200 is generated by the CPU 101 and is supplied by the CPU 101 to a communication unit 203 in the TV 200.

Furthermore, the communication unit 103 can supply +5 V to the TV 200 via the +5 V power line 301.

Moreover, the communication unit 103 can receive the L level or the H level HPD signal from the TV 200 via the HPD line 302. The HPD signal that the communication unit 103 received from the TV 200 is detected by a HPD signal unit 103a. The HPD signal detection unit 103a determines whether the detected HPD signal is an H level HPD signal or an L level HPD signal and notifies the CPU 101 of the determination result. As a result, the CPU 101 can also determine whether the HPD signal received by the communication unit 103 from the TV 200 is an H level HPD signal or an L level HPD signal.

Further, the communication unit 103 can receive the EDID of the TV 200 via the DDC line 303. If the communication unit 103 receives the EDID of the TV 200 from the TV 200, the EDID is supplied to a device information acquisition unit 103b. The device information acquisition unit 103b determines whether the communication unit 103 received the EDID of the TV 200 from the TV 200 and notifies the CPU 101 of the determination result. The EDID of the TV 200 is then supplied to the CPU 101 via the device information acquisition unit 103b. The CPU 101 stores in a memory 207 the EDID of the TV 200 supplied by the device information acquisition unit 103b.

Upon receiving the EDID of the TV 200 from the TV 200, the CPU 101 can also analyze the EDID. The CPU 101 executes the EDID analysis including a first analysis, a second analysis, and a third analysis to check whether the EDID of the TV 200 supplied by the device information acquisition unit 103b is correct. In the first analysis, the CPU 101 checks whether the EDID received from the TV 200 satisfies a predetermined format. In the second analysis, the CPU 101 checks whether the EDID received from the TV 200 contains a transmission error. In the third analysis, the CPU 101 checks whether the EDID received from the TV 200 contains an abnormal value.

The image capture unit 104 captures an object and generates the video data from an optical image of the object when the operation mode of the video camera 100 is an image capture mode. The video data generated by the image capture unit 104 can be either a moving image or a still image. The image capture unit 104 then supplies the generated video data to the communication unit 103, the recording unit 105, and the display unit 106. If the correct EDID is received from the TV 200, the image capture unit 104 converts the video data to be supplied to the communication unit 103 into video data appropriate for the display capability of the TV 200. The video data supplied by the image capture unit 104 to the communication unit 103 is then transmitted to the TV 200 via the TMDS line 304. The video data supplied to the recording unit 105 is recorded on the recording medium 105a, and the video data supplied to the display unit 106 is displayed on the display unit 106.

Further, when the image capture unit 104 generates the video data, the microphone unit (not illustrated) generates the audio data and then supplies the generated audio data to the communication unit 103, the recording unit 105, and a speaker unit (not illustrated). If the correct EDID is received from the TV 200, the microphone unit converts the audio data to be supplied to the communication unit 103 into the audio data appropriate for the audio output capability of the TV 200. The audio data supplied by the microphone unit to the communication unit 103 is then transmitted to the TV 200 via the TMDS line 304. The audio data supplied by the microphone unit to the recording unit 105 is recorded on the recording medium 105a, and the audio data supplied by the microphone unit to the display unit 106 is output to the speaker unit.

On the other hand, if the operation mode of the video camera 100 is the playback mode, the image capture unit 104 stops capturing the object and stops generating the video data from the optical image of the object.

The recording unit 105 can record onto the recording medium 105a the video data generated by the image capture unit 104 and the audio data generated by the microphone unit when the operation mode of the video camera 100 is the image capture mode. The CPU 101 controls recording of the video data and the audio data generated by the image capture unit 104 and the microphone unit onto the recording medium 105a according to a user instruction input via the operation unit 107. The CPU 101 can also control the recording according to the CEC command received from the TV 200.

Further, when the operation mode of the video camera 100 is the playback mode, the recording unit 105 can reproduce from the recording medium 105a the video data and the audio data selected by the user. The CPU 101 controls the selection of the video data and the audio data to be reproduced from the recording medium 105a according to the user instruction input via the operation unit 107. The CPU 101 can also control the selection according to the CEC command received from the TV 200.

The recording unit 105 then supplies the video data reproduced from the recording medium 105a to the communication unit 103 and the display unit 106. If the correct EDID is received from the TV 200, the recording unit 105 converts the video data to be supplied to the communication unit 103 into video data appropriate for the display capability of the TV 200. The video data supplied by the recording unit 105 to the communication unit 103 is then transmitted to the TV 200 via the TMDS line 304, and the video data supplied by the recording unit 105 to the display unit 106 is displayed on the display unit 106. Further, the recording unit 105 supplies the audio data reproduced from the recording medium 105*a* to the communication unit 103 and a speaker unit (not illustrated). If the correct EDID is received from the TV 200, the recording unit 105 converts the audio data to be supplied to the communication unit 103 into video data appropriate for the display capability of the TV 200. The audio data supplied by the recording unit 105 to the communication unit 103 is then transmitted to the TV 200 via the TMDS line 304, and the audio data supplied by the recording unit 105 to the speaker unit is output from the speaker unit.

Examples of the recording medium 105*a* are a memory card and a hard disk apparatus. The recording medium 105*a* can be built in the video camera 100 or can be the one detachable from the video camera 100.

The display unit 106 is a display device such as a liquid crystal display (LCD). If the operation mode of the video camera 100 is the image capture mode, the display unit 106 displays the video data generated by the image capture unit 104. On the other hand, if the operation mode of the video camera 100 is the playback mode, the display unit 106 displays the video data that the recording unit 105 reproduces from the recording medium 105*a*.

The operation unit 107 provides the user with a user interface for operating the video camera 100. The operation unit 107 is configured of a plurality of buttons for operating the video camera 100. Each button is formed of a switch, a touch panel, or the like. The CPU 101 can control the video camera 100 according to the user instruction input via the operation unit 107.

The operation unit 107 includes a power supply button, a mode change button, a start/stop button, a menu button, a + button, a − button, and a SET button. The + button and − button may be replaced with a cross button.

A power button is used to instruct the CPU 101 to switch the video camera 100 on or off. When the power button is on, the electric power required by the entire video camera 100 can be supplied by a power supply (not illustrated) such as a battery or an alternate current (AC) power supply. When the power button is off, the power supply stops supplying the electric power to a portion of or the entire video camera 100.

The mode change button is used to instruct the CPU 101 to change the operation mode of the video camera 100 to either the image capture mode or the playback mode. The start/stop button is used to instruct the CPU 101 to start or temporarily stop recording the video data generated by the image capture unit 104 onto the recording medium 105*a*.

The menu button is used to instruct the CPU 101 to display or not display a menu screen of the video camera 100. The menu screen of the video camera 100 includes a menu screen for controlling the video camera 100 and a menu screen for changing the settings of the video camera 100. Such menu screens are stored in the memory 102. When the menu screen is to be displayed, the CPU 101 reads the menu screen to be displayed from the memory 102 and supplies the read menu screen to the display unit 106. The CPU 101 then superimposes a cursor on the menu screen to be supplied to the display unit 106. The display unit 106 superimposes the menu screen an the like supplied by the CPU 101 on the video data supplied by the image capture unit 104 or the recording unit 105. As a result, the display unit 106 displays the video data on which the menu screen is superimposed. When the menu screen is not to be displayed, the CPU 101 stops supplying the menu screen to the display unit 106.

The + button and the − button are buttons for moving the cursor on the menu screen. The SET button is used to instruct the CPU 101 to execute an item selected using the cursor. The user can also jump between the menu screens using the + button, − button, and the SET button.

The operation unit 107 further includes a play button, a stop button, a pause button, a fast forward button, and a rewind button. The play button is used to instruct the CPU 101 to reproduce (play) the video data recorded on the recording medium 105*a*. The stop button is used to instruct the CPU 101 to stop reproducing the video data recorded on the recording medium 105*a*. The pause button is used to instruct the CPU 101 to temporarily stop (pause) reproducing the video data recorded on the recording medium 105*a*. The fast forward button is used to instruct the CPU 101 to fast forward the video data recorded on the recording medium 105*a*. The rewind button is used to instruct the CPU 101 to rewind the video data recorded on the recording medium 105*a*.

An example of the configuration of the TV 200 will be described below with reference to FIG. 2.

Referring to FIG. 2, the TV 200 includes a CPU 201, a tuner unit 202, a communication unit 203, a display unit 204, an operation unit 205, a remote control receiving unit 206, and a memory 207.

The CPU 201 controls the overall operation of the TV 200 according to the computer program stored in the memory 207.

The tuner unit 202 receives the TV broadcast of a TV channel selected by the user using the remote control 400. Upon receiving from the remote control 400 a control signal indicating the TV channel selected by the user, the remote control receiving unit 206 supplies the received control signal to the CPU 201. The CPU 201 then controls the tuner unit 202 according to the control signal received from the remote control receiving unit 206. The user can also select the TV channel using the operation unit 205. In such a case, the CPU 201 controls the tuner unit 202 according to the user instruction input via the operation unit 205. The tuner unit 202 can thus receive the TV broadcast of the TV channel selected by the user using the remote control 400 or the operation unit 205. The video data included in the TV broadcast received by the tuner 202 is then displayed on the display unit 204, and the audio data included in the TV broadcast received by the tuner 202 is output from the speaker unit (not illustrated). The auxiliary data included in the TV broadcast received by the tuner 202 is supplied to the CPU 201, and the CPU 201 can then control the TV 200 according to the auxiliary data received from the video camera 100.

The communication unit 203 includes the HDMI terminal for connecting the HDMI cable 300, so that the communication 203 can thus receive the video data, the audio data, and the auxiliary data transmitted from the video camera 100 via the TMDS line 304. The video data received from the video camera 100 is displayed on the display unit 204, and the audio data received from the video camera 100 is output from the speaker unit (not illustrated). The auxiliary data received from the video camera 100 is supplied to the CPU 201, and the CPU 201 can then control the TV 200 according to the received auxiliary data.

Further, the communication unit 203 can receive the CEC command transmitted from the video camera 100 via the CEC line 305, and the received CEC command is supplied to the CPU 201. The CPU 201 can then control the TV 200 according to the CEC command received from the video camera 100. The communication unit 203 can also transmit the CEC command for controlling the video camera 100 to the video camera 100 via the CEC line 305. The CPU 201 generates the CEC command for controlling the video camera 100 and supplies the generated CEC command to the communication unit 203.

Furthermore, the communication unit 203 can determine whether the video camera 100 is supplying +5 V to the TV 200 via the +5 V power line 301. The communication unit 203 then notifies the CPU 201 of the determination result. The CPU 201 can thus also determine whether the video camera 100 is supplying +5 V to the TV 200 via the +5 V power line 301.

If the video camera 100 is supplying +5 V to the TV 200, the CPU 201 determines whether the EDID of the TV 200 can be transmitted to the video camera 100. If the EDID of the TV 200 can be transmitted to the video camera 100, the communication unit 203 transmits the H level HPD signal to the video camera 100 via the HPD line 302.

On the other hand, if the EDID of the TV 200 cannot be transmitted to the video camera 100 even when the video camera 100 is supplying +5 V to the TV 200, the communication unit 203 transmits the L level HPD signal to the video camera 100 via the HPD line 302. The communication unit 203 also transmits the L level HPD signal to the video camera 100 via the HPD line 302 when the video camera 100 is not supplying +5 V to the TV 200.

Moreover, the communication unit 203 can transmit to the video camera 100 via the DDC line 303 the EDID of the TV 200 which is stored in the memory 207.

The display unit 204 is configured of the display device such as the LCD. The display unit 204 can display the video data supplied by at least one of the tuner unit 202 and the communication unit 203.

The operation unit 205 provides the user with the user interface for operating the TV 200. The operation unit 205 includes a plurality of buttons for the user to operate the TV 200, similarly as the remote control 400. Each button is formed of a switch, a touch panel, or the like. The CPU 201 can control the TV 200 according to the user instruction input via the operation unit 205.

The remote control receiving unit 206 supplies to the CPU 201 the control signal received from the remote control 400. As a result, the user instruction input to the remote control 400 is input to the CPU 201 via the remote control 400 and the remote control receiving unit 206. The CPU 201 can then control at least one of the TV 200 and the video camera 100 according to the control signal from the remote control receiving unit 206. In a case where the video camera 100 is controlled according to the control signal from the remote control receiving unit 206, the CPU 201 generates the CEC command corresponding to the control signal from the remote control receiving unit 206 and then supplies the generated CEC command to the communication unit 203. The communication unit 203 transmits the supplied CEC command to the video camera 100 via the CEC line 305, so that the user can remotely control the video camera 100 using the remote control 400.

The remote control 400 provides the user with the user interface for operating the video camera 100 and the TV 200. The remote control 400 is configured of a plurality of buttons for operating the video camera 100 and a plurality of buttons for operating the TV 200. Each button included in the remote control 400 is formed of a switch, a touch panel, or the like.

More specifically, the remote control 400 includes a first power button, a channel selection button, an external input button, a menu button, a + button, a − button, and a SET button. These buttons are used to operate the TV 200.

The first power switch button is used to instruct the CPU 101 to switch the video camera 100 on or off. When the power button is on, the electric power necessary for the entire TV 200 can be supplied by the power supply (not illustrated). When the power button is off, the power supply stops supplying the electric power to a portion of or the entire TV 200. The channel selection button is used to select the TV channel to be received by the tuner unit 202. The external input button is used to select either the video data included in the TV broadcast received from the tuner unit 202 or the video data received from the video camera 100, and to display the selected video data on the display unit 204.

The menu button is used to instruct the CPU 201 to display or not display the menu screen of the TV 200. The menu screen of the TV 200 includes the menu screen for controlling the TV 200 and the menu screen for changing settings of the TV 200. Such menu screens are stored in the memory 207. When the menu screen is to be displayed, the CPU 201 reads the menu screen to be displayed from the memory 207 and supplies the read menu screen to the display unit 204. The CPU 201 then superimposes a cursor and the like on the menu screen to be supplied to the display unit 204. The display unit 204 further superimposes the menu screen supplied by the CPU 201 on the video data supplied by the tuner unit 202 or the communication unit 203. As a result, the display unit 204 displays video data on which the menu screen is superimposed. When the menu screen is not to be displayed, the CPU 201 stops supplying the menu screen to the display unit 204.

The + button and the − button are buttons for moving the cursor on the menu screen. A SET button is used to instruct the CPU 201 to execute the item selected by the cursor. The user can also jump between the menu screens using the + button, − button, and the SET button.

When the menu screen of the video camera 100 is being displayed on the TV 200, the + button, the − button, and the SET button can be used to move the cursor on the menu screen. In such a case, the CPU 201 generates the CEC command corresponding to the operation of the + button, the − button, and the SET button and supplies the generated CEC command to the communication unit 203. The communication unit 203 then transmits the CEC command from the CPU 201 to the video camera 100 via the CEC line 305.

The remote control 400 further includes a second power button, a play button, a stop button, a pause button, a fast forward button, a rewind button, a start/stop button, and a menu button. These buttons are used to operate the video camera 100.

The second power button is used to instruct the CPU 201 to transmit the power on command or the power off command to the video camera 100 via the CEC line 305. The power on command is the CEC command for instructing the CPU 101 to switch the video camera 100 on. The power off command is the CEC command for instructing the CPU 101 to switch the video camera 100 off.

The play button is used to instruct the CPU 201 to transmit to the video camera 100 via the CEC line 305 the reproduce command, i.e., the CEC command for instructing the CPU 101 to reproduce (play) the video data recorded on the recording medium 105*a*. The stop button is used to instruct the CPU 201 to transmit to the video camera 100 via the CEC line 305 the stop command, i.e., the CEC command for instructing the CPU 101 to stop reproducing the video data recorded on the recording medium 105*a*. The pause button is used to instruct the CPU 201 to transmit to the video camera 100 via the CEC line 305 a temporary stop command, i.e., the CEC command for instructing the CPU 101 to temporarily stop (pause) reproducing the video data recorded on the recording medium 105*a*. The fast forward button is used to instruct the CPU 201 to transmit to the video camera 100 via the CEC line 305*a* fast forward command, i.e., the CEC command for instructing the CPU 101 to fast forward the video data recorded on the recording medium 105*a*. The rewind button is used to instruct the CPU 201 to transmit to the video camera 100 via the CEC line 305 a rewind command, i.e., the CEC command for instructing the CPU 101 to rewind the video data recorded on the recording medium 105*a*.

The start/stop button is used to instruct the CPU 201 to transmit a record command or a command to temporarily stop recording to the video camera 100 via the CEC line 305. The record command is the CEC command for instructing the CPU 101 to start recording the video data generated by the image capture unit 104 onto the recording medium 105*a*. The command to temporarily stop recording is the CEC command for instructing the CPU 101 to temporarily stop recording the video data generated by the image capture unit 104 onto the recording medium 105*a*.

The menu button is used to instruct the CPU 201 to transmit a menu on command or a menu off command to the video camera 100 via the CEC line 305. The menu on command is the CEC command for instructing the CPU 101 to display the menu screen of the video camera 100. When the menu screen is to be displayed, the CPU 101 reads the menu screen to be displayed from the memory 102 and supplies the read menu screen to the display unit 106. The CPU 101 then superimposes a cursor and the like on the menu screen to be supplied to the display unit 106. The display unit 106 further superimposes the menu screen supplied by the CPU 101 on the video data supplied by the image capture unit 104 or the recording unit 105. As a result, the display unit 106 displays video data on which the menu screen is superimposed. On the other hand, the menu off command is the CEC command for instructing the CPU 101 not to display the menu screen of the video camera 100. When the menu screen is not to be displayed, the CPU 101 stops supplying the menu screen to the display unit 106.

The connection establishing process executed by the video camera 100 according to the first exemplary embodiment will be described below with reference to FIGS. 1, 2, and 3.

Figure 3:
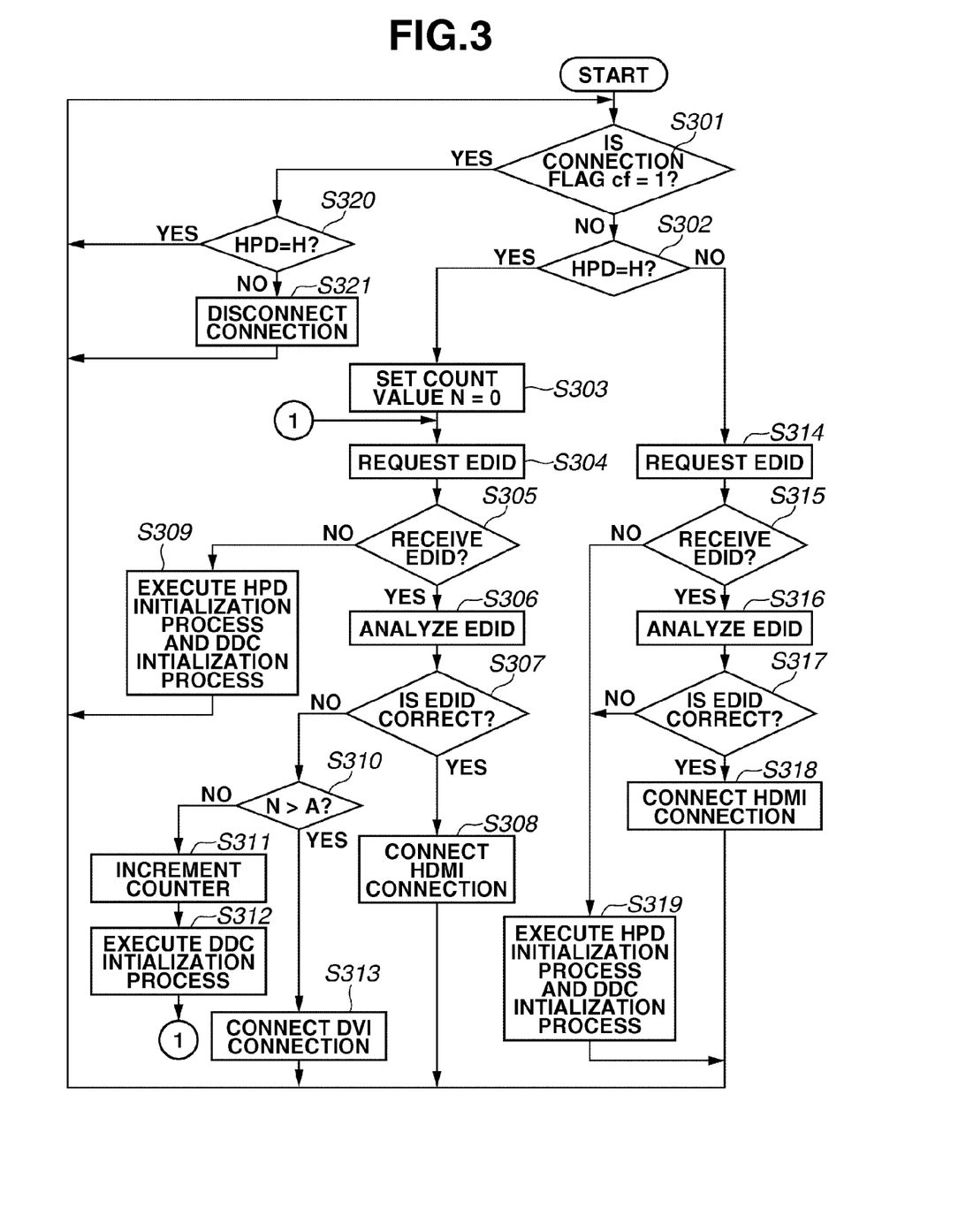
FIG. 3 is a flowchart illustrating a connection establishing process according to the first exemplary embodiment of the present invention.

FIG. 3 is a flowchart illustrating an example of a connection establishing process executed by the video camera 100 according to the first exemplary embodiment. The process illustrated in FIG. 3 is executed when the video camera 100 and the TV 200 are connected via the HDMI cable 300 and the video camera 100 is supplying +5 V to the video camera 100. Further, the process illustrated in FIG. 3 is controlled by the CPU 101 executing the computer program stored in the memory 102.

In step S301, the CPU 101 determines whether a connection flag cf stored in the memory 102 is set to ⌈1⌋ or ⌈0⌋. If the connection flag cf is set to ⌈1⌋ (YES in step S301), the CPU 101 determines that the HDMI connection or a DVI connection is connected between the video camera 100 and the TV 200. The DVI connection is a connection for realizing communication complying with the DVI standard. The process then proceeds to step S320.

On the other hand, if the connection flag cf is set to ⌈0⌋ (NO in step S301), the CPU 101 determines that the HDMI connection or a DVI connection is not connected between the video camera 100 and the TV 200. The process then proceeds to step S302.

In step S302, the HPD signal detection unit 103*a* detects the HPD signal that the communication unit 103 received from the TV 200 and determines whether the detected HPD signal is H level or L level. The HPD signal detection unit 103*a* then notifies the CPU 101 of the determination result, so that the CPU 101 can also determine whether the HPD signal is H level or L level. The CPU 101 thus determines whether the EDID of the TV 200 can be readout from the TV 200 based on the HPD signal that the communication unit 103 received from the TV 200 (i.e., a first determination).

If the HPD signal detection unit 103*a* determines that the HPD signal received from the TV 200 is H level (YES in step S302), the process proceeds to step S303. On the other hand, if the HPD signal detection unit 103*a* determines that the HPD signal received from the TV 200 is L level (NO in step S302), the process proceeds to step S314.

In the case where the HPD signal detection unit 103*a* determines that the HPD signal received from the TV 200 is H level, the CPU 101 determines that the EDID of the TV 200 can be read out from the TV 200. In step S303, the CPU 101 then controls the counter 101*a* so that the count value N is set to 0. The process then proceeds to step S304.

In step S304, the CPU 101 instructs the device information acquisition unit 103*b* to transmit an EDID request signal to the TV 200 via the DDC line 303. The device information acquisition unit 103*b* then transmits the EDID request signal to the TV 200 via the DDC line 303 according to the instruction from the CPU 101. The EDID request signal is a signal for requesting the TV 200 to transmit the EDID of the TV 200. By transmitting the EDID request signal to the TV 200, the video camera 100 can read out the EDID of the TV 200 from the TV 200. Upon receiving the EDID request signal, the TV 200 reads out the EDID of the TV 200 from the memory 207 and transmits the EDID of the TV 200 to the video camera 100 via the communication unit 203 and the DDC line 303. The communication unit 103 then supplies the EDID of the TV 200 received from the TV 200 to the device information acquisition unit 103*b*. After device information acquisition unit 103*b* transmits the EDID request signal to the TV 200, the process proceeds to step 305.

However, if there is an error in the cable connection between the video camera 100 and the TV 200, the video camera 100 may not be able to receive the EDID of the TV 200 transmitted from the TV 200. To solve such a problem, in step S305, the device information acquisition unit 103*b* determines whether the communication unit 103 has received the EDID of the TV 200 from the TV 200. The device information acquisition unit 103*b* notifies the CPU 101 of the determination result, so that the CPU 101 can also determine whether the communication unit 103 has received the EDID of the TV 200 from the TV 200.

If the device information acquisition unit 103*b* determines that the EDID of the TV 200 is received from the TV 200 (YES in step S305), the device information acquisition unit 103*b* supplies the EDID of the TV 200 to the CPU 101 which then stores the EDID of the TV 200 in the memory 102. The process proceeds to step S306. On the other hand, if the device information acquisition unit 103*b* determines that the EDID of the TV 200 is not received from the TV 200 (NO in step S305), the process proceeds to step S309.

Further, if a transmission error or a loss of the EDID is caused in the received EDID of the TV 200 from the TV 200, the received EDID is not the correct EDID of the TV 200. Therefore, in step S306, the CPU 101 analyzes the received EDID of the TV 200 stored in the memory 102. After the CPU 101 analyzes the EDID, the process proceeds to step S307.

In step S307, the CPU 101 determines whether the EDID received from the TV 200 is correct, based on the result of the analysis in step S306 (i.e., a second determination).

The CPU 101 determines that the EDID received from the TV 200 is not correct in a case where the EDID received from the TV 200 does not satisfy the predetermined format. For example, if the content of the EDID is destructed, the CPU 101 determines that the EDID received from the TV 200 does not satisfy the predetermined format and thus determines that the EDID is not correct.

Further, if a portion of the EDID received from the TV 200 is missing, the CPU 101 also determines that the EDID received from the TV 200 does not satisfy the predetermined format and thus determines that the EDID is not correct.

Furthermore, if the EDID received from the TV 200 contains a transmission error, the CPU 101 also determines that the EDID received from the TV 200 does not satisfy the predetermined format. Whether the EDID contains the transmission error can be determined using a check sum of the EDID.

Moreover, if the EDID received from the TV 200 contains an abnormal value, the CPU 101 determines that the EDID is not correct. For example, if the values of the EDID received from the TV 200 are all 0, the CPU 101 determines that the EDID received from the TV 200 contains an abnormal value and thus determines that the EDID is not correct.

Therefore, the CPU 101 determines that the EDID received from the TV 200 is correct if the EDID satisfies the predetermined format, does not contain a transmission error, and does not contain an abnormal value.

If the EDID received from the TV 200 is determined to be correct (YES ins step S307), the process proceeds to step S308. On the other hand, if the EDID received from the TV 200 is determined to be not correct (NO in step S307), the process proceeds to step S310.

If the EDID received from the TV 200 is determined to be correct (i.e., YES ins step S307), the video camera 100 has been able to acquire the correct EDID from the TV 200. The CPU 101 can then connect the HDMI connection between the video camera 100 and the TV 200 by controlling the communication unit 103 using the EDID of the TV 200. In step S308, the CPU 101 thus instructs the communication 103 to connect the HDMI connection between the video camera 100 and the TV 200. The communication unit 103 connects the HDMI connection between the video camera 100 and the TV 200 according to the instruction from the CPU 101.

The CPU 101 can automatically recognize the display capability and the audio output capability of the TV 200 by referring to the correct EDID of the TV 200 acquired from the TV 200. Further, the CPU 101 can automatically recognize the video format and the audio format appropriate for the display capability and the audio output capability of the TV 200.

For example, if the operation mode of the video camera 100 is the image capture mode, the CPU 101 notifies the image capturing unit 104 of the video format which is most appropriate for the display capability of the TV 200 among the plurality of video formats supported by the video camera 100. Further, in such a case, the CPU 101 notifies the microphone unit of the audio format which is most appropriate for the audio output capability of the TV 200 among the plurality of video formats supported by the video camera 100. The image capturing unit 104 then converts the video data supplied by the communication unit 103 into the video data complying with the video format notified from the CPU 101. As a result, the video data transmitted from the video camera 100 to the TV 200 becomes the video data appropriate for the display capability of the TV 200. The microphone unit also converts the audio data supplied by the communication unit 103 into the audio data complying with the audio format notified from the CPU 101. The audio data transmitted from the video camera 100 to the TV 200 thus becomes the audio data appropriate for the audio output capability of the TV 200.

Furthermore, if the operation mode of the video camera 100 is the playback mode, the CPU 101 notifies the recording unit 105 of the video format which is most appropriate for the display capability of the TV 200 among the plurality of video formats supported by the video camera 100. The CPU 101 also notifies the recording unit 105 of the audio format which is most appropriate for the audio output capability of the TV 200 among the plurality of video formats supported by the video camera 100. The recording unit 105 then converts the video data supplied by the communication unit 103 into the video data complying with the video format notified from the CPU 101. As a result, the video data transmitted from the video camera 100 to the TV 200 becomes the video data appropriate for the display capability of the TV 200. The recording unit 105 also converts the audio data supplied by the communication unit 103 into the audio data complying with the audio format notified from the CPU 101. The audio data transmitted from the video camera 100 to the TV 200 thus becomes the audio data appropriate for the audio output capability of the TV 200.

While the HDMI connection is connected, the communication unit 103 can transmit to the TV 200 via the TMDS line 304 the video data and the audio data supplied by either the image capturing unit 104 or the recording unit 105. The communication unit 103 can also transmit the auxiliary data supplied by the CPU 101 to the TV 200 via the TMDS line 304.

Further, while the HDMI connection is connected, the communication unit 103 can transmit to the TV 200 via the CEC line 305 the control command for controlling the TV 200. Furthermore, while the HDMI connection is connected, the communication unit 103 can receive from the TV 200 via the CEC line 305 the control command for controlling the video camera 100.

When the HDMI connection is connected, the CPU 101 sets the connection flag cf stored in the memory 102 to [1]. The process then returns to step S301.

Returning to step S305, if it is determined that the EDID of the TV 200 is not received from the TV 200 even when the HD signal is H level (NO in step S305), the CPU 101 determines that there is an error in at least one of the HPD line 302 and the DDC line 303. In step S309, the CPU 1010 then instructs the communication unit 103 to execute a HPD initialization process and a DDC initialization process. The communication unit 103 thus executes the HPD initialization process and the DDC initialization process according to the instruction from the CPU 101. The HPD initialization process initializes the HPD signal detection unit 103a for reconfirming whether the HPD signal is H level. The DDC initialization process initializes the device information acquisition unit 103b for reacquiring the EDID of the TV 200.

When the communication unit 103 executes the HPD initialization process and the DDC initialization process, the CPU 101 controls the communication unit 103 so that the video camera 100 does not stop supplying +5 V to the TV 200. This prevents the TV 200 from recognizing the video camera 100 as a newly connected device, and it becomes unnecessary for the TV 200 to recognize the connection again between the video camera 100 and restart the transmission of the H level HPD signal. The video camera 100 can thus speedily reacquire the EDID.

After the communication unit 103 executes the HPD initialization process and the DDC initialization process, the process illustrated in FIG. 3 returns to step S301. The video camera 100 can thus reconfirm the HPD signal and reacquire the EDID.

Returning to step S307, if the EDID received from the TV 200 is not correct even when the HPD signal is H level (NO in step S307), the CPU 101 determines that there is an error in the DDC line 303. For example, if chattering is generated in the DDC line 303, the EDID of the TV 200 may not be received as the correct EDID. In step S310, the CPU 101 then compares the count value N and a predetermined value A stored in the memory 102 and determines whether the count value N is greater than the predetermined value A. The predetermined value A is an arbitrary value such as 1. As a result, the CPU 101 can repeat reacquisition of the EDID until the count value N becomes greater than the predetermined value A.

If the CPU 101 determines that the count value N is greater than the predetermined value A (YES in step S310), the process proceeds to step S313. On the other hand, if the CPU 101 determines that the count value N is not greater than the predetermined value A (NO in step S310), the process proceeds to step S311.

In step S311, the counter 101a increments the count value N by 1 according to the instruction from the CPU 101. The process then proceeds to step S312.

In step S312, the CPU 101 instructs the communication unit 103 to execute the above described DDC initialization process. The communication unit 103 thus executes the DDC initialization process according to the instruction from the CPU 101.

In step S312, it is highly possible that the connection of the HPD line 302 is normal. Therefore, when instructing the communication unit 103 to execute the DDC initialization process, the CPU 101 instructs the communication unit 103 not to execute the above described HPD initialization process. As a result, the video camera 100 can omit the HPD initialization process, so that the EDID can be more simply and speedily reacquired.

Further, when the communication unit 103 executes the DDC initialization process, the CPU 101 controls the communication unit 103 so that the video camera 100 does not stop supplying +5 V to the TV 200. This prevents the TV 200 from recognizing the video camera 100 as a newly connected device. It thus becomes unnecessary for the TV 200 to recognize the connection again between the video camera 100 and restart the transmission of the H level HPD signal, so that the video camera 100 can quickly reacquire the EDID.

After the communication unit 103 executes the DDC initialization process, the process returns to step S304. As a result, the video camera 100 can thus reacquire the EDID.

Returning to step S310, if the CPU 101 determines that the count value N is greater than the predetermined value A (YES in step S310), it is determined that the video camera 100 has not received the correct EDID from the TV 200. In such a case, the CPU 101 controls the communication unit 103 without using the EDID of the TV 200, so that the HDMI connection cannot be connected between the video camera 100 and the TV 200. However, it is highly possible that the connection of the HPD line 302 is normal. Therefore, in step S313, the CPU 101 instructs the communication unit 103 to connect the DVI connection between the video camera 100 and the TV 200. The communication unit 103 thus connects the DVI connection between the video camera 100 and the TV 200.

While the DVI connection is connected, the video camera 100 can transmit to the TV 200 via the TMDS line 304 the video data supplied by either the image capture unit 104 or the recording unit 105. However, the video camera 100 cannot transmit the audio data supplied by either the microphone unit or the recording unit 105 to the TV 200 via the TMDS line 304. Further, the video camera 100 cannot use the CEC line 305.

When the DVI connection is connected, the CPU 101 sets the connection flag cf stored in the memory 102 to [1]. The process then returns to step S301.

Returning to step S302, if the CPU 101 determines that the HPD signal received from the TV 200 is L level (NO in step S302), the CPU 101 determines that the EDID of the TV 200 cannot be read out from the TV 200. However, there is a case where the EDID of the TV 200 can be read out from the TV 200 even when the HPD signal is determined to be L level. For example, if there is an error in the cable connection between the video camera 100 and the TV 200, the TV 200 may be transmitting the H level HPD signal even when the video camera 100 determines that the HPD signal is L level. In step S314, the CPU 101 thus controls the device information acquisition unit 103b to transmit the EDID request signal to the TV 200 via the DDC line 303, so that the video camera 100 can read out the EDID of the TV 200 from the TV 200. If the EDID of the TV 200 can be read out, the TV 200 receiving the EDID request signal transmits the EDID of the TV 200 to the video camera 100. Upon receiving the EDID of the TV 200 from the TV 200, the communication unit 103 supplies the received EDID to the device information acquisition unit 103b. After the device information acquisition unit 103b transmits the EDID request signal to the TV 200, the process proceeds to step S315.

However, if there is an error in the cable connection between the video camera 100 and the TV 200, the video camera 100 may not receive the EDID of the TV 200 even when the TV 200 transmits the EDID to the video camera 100. In step S315, the device information acquisition unit 103b thus determines whether the communication unit 103 has received the EDID of the TV 200 from the TV 200. The device information acquisition unit 103b then notifies the CPU 101 of the determination result, so that the CPU 101 can also determine whether the communication unit 103 has received the EDID of the TV 200 from the TV 200. If the communication unit 103 has received the EDID of the TV 200 from the TV 200, the device information acquisition unit 103b supplies the EDID of the TV 200 to the CPU 101. The CPU 101 then stores the EDID of the TV 200 in the memory 102.

If the communication unit 103 has received the EDID of the TV 200 from the TV 200 (YES in step S315), the process proceeds to step S316. On the other hand, if the communication unit 103 has not received the EDID of the TV 200 from the TV 200 (NO in step S315), the process proceeds to step S319.

In a case where a transmission error or a loss of the EDID is caused in the EDID of the TV 200 received from the TV 200, the received EDID is not the correct EDID of the TV 200. Therefore, in step S316, the CPU 101 executes the above described EDID analysis and analyzes the EDID of the TV 200 stored in the memory 102. Since the analysis executed in step S316 is similar to the analysis executed in step S306, a detailed description will be omitted. Upon completion of the EDID analysis, the process proceeds to step S317.

In step S317, the CPU 101 determines whether the EDID received from the TV 200 is correct based on the analysis result acquired in step S316. Since the determination process executed in step S317 is similar to the determination process executed in step S307, a detailed description will be omitted.

If the CPU 101 determines that the EDID received from the TV 200 is correct (YES in step S317), the process proceeds to step S318. If the CPU 101 determines that the EDID received from the TV 200 is not correct (NO in step S317), the process proceeds to step S319.

If the CPU 101 determines that the EDID received from the TV 200 is correct (i.e., YES in step S317), the video camera 100 has acquired the correct EDID from the TV 200. In such a case, the CPU 101 can connect the HDMI connection between the video camera 100 and the TV 200 by controlling the communication unit 103 using the EDID of the TV 200. Therefore, in step S318, the CPU 101 instructs the communication unit 103 to connect the HDMI connection between the video camera 100 and the TV 200. The communication unit 103 then connects the HDMI connection between the video camera 100 and the TV 200 according to the instruction from the CPU 101.

Upon acquiring the correct EDID from the TV 200, the CPU 101 can automatically recognize display capability and the audio output capability of the TV 200 by referring to the EDID of the TV 200. Further, the CPU 101 can automatically recognize the video format and the audio format appropriate for the display capability and the audio output capability of the TV 200.

For example, if the operation mode of the video camera 100 is the image capture mode, the CPU 101 notifies the image capturing unit 104 of the video format which is most appropriate for the display capability of the TV 200 among the plurality of video formats supported by the video camera 100. Further, in such a case, the CPU 101 notifies the microphone unit of the audio format which is most appropriate for the audio output capability of the TV 200 among the plurality of video formats supported by the video camera 100. The image capturing unit 104 then converts the video data supplied by the communication unit 103 into the video data complying with the video format notified from the CPU 101. As a result, the video data transmitted from the video camera 100 to the TV 200 becomes the video data appropriate for the display capability of the TV 200. The microphone unit also converts the audio data supplied by the communication unit 103 into the audio data complying with the audio format notified from the CPU 101. The audio data transmitted from the video camera 100 to the TV 200 thus becomes the audio data appropriate for the audio output capability of the TV 200.

Furthermore, if the operation mode of the video camera 100 is the playback mode, the CPU 101 notifies the recording unit 105 of the video format which is most appropriate for the display capability of the TV 200 among the plurality of video formats supported by the video camera 100. The CPU 101 also notifies the recording unit 105 of the audio format which is most appropriate for the audio output capability of the TV 200 among the plurality of video formats supported by the video camera 100. The recording unit 105 then converts the video data supplied by the communication unit 103 into the video data complying with the video format notified from the CPU 101. As a result, the video data transmitted from the video camera 100 to the TV 200 becomes the video data appropriate for the display capability of the TV 200. The recording unit 105 also converts the audio data supplied by the communication unit 103 into the audio data complying with the audio format notified from the CPU 101. The audio data transmitted from the video camera 100 to the TV 200 thus becomes the audio data appropriate for the audio output capability of the TV 200.

While the HDMI connection is connected, the communication unit 103 can transmit the video data and the audio data supplied by either the image capturing unit or the recording unit 105 to the TV 200 via the TMDS line 304. The communication unit 103 can also transmit the auxiliary data supplied by the CPU 101 to the TV 200 via the TMDS line 304.

Further, while the HDMI connection is connected, the communication unit 103 can transmit to the TV 200 via the CEC line 305 the control command for controlling the TV 200. Furthermore, while the HDMI connection is connected, the communication unit 103 can receive from the TV 200 via the CEC line 305 the control command for controlling the video camera 100.

When the HDMI connection is connected, the CPU 101 set the connection flag cf stored in the memory 102 to [1]. The process then returns to step S301.

Returning to step S315, if the EDID of the TV 200 cannot be received from the TV 200 when the HD signal is L level (i.e., NO in step S315), the CPU 101 determines that there is an error in at least one of the HPD line 302 and the DDC line 303. Further, if the EDID of the TV 200 received from the TV 200 is not correct when the HD signal is L level (i.e., NO in step S317), the CPU 101 also determines that there is an error in at least one of the HPD line 302 and the DDC line 303. In step S319, the CPU 101 then instructs the communication unit 103 to execute the HPD initialization process and the DDC initialization process. The communication unit 103 thus executes the HPD initialization process and the DDC initialization process according to the instruction from the CPU 101.

When the communication unit 103 executes the HPD initialization process and the DDC initialization process, the CPU 101 controls the communication unit 103 so that the video camera 100 does not stop supplying +5 V to the TV 200. This prevents the TV 200 from recognizing the video camera 100 as a newly connected device. As a result, the TV 200 does not recognize the connection again between the video camera 100 and restart the transmission of the H level HPD signal, so that the video camera 100 can speedily reacquire the EDID.

After the communication unit 103 executes the HPD initialization process and the DDC initialization process, the process illustrated in FIG. 3 returns to step S301. The video camera can thus reconfirm the HPD signal and reacquire the EDID.

In step S320, the HPD signal detection unit 103a detects the HPD signal that the communication unit 103 received from the TV 200 and determines whether the detected HPD signal is H level or L level. The HPD signal detection unit 103a then notifies the CPU 101 of the determination result. The CPU can thus also determine whether the HPD signal that the communication unit 103 received from the TV 200 is H level or L level.

If it is determined that the received HPD signal is H level (YES in step S320), the process returns to step S301. On the other hand, if it is determined that the received HPD signal is L level (NO in step S320), the process proceeds to step S321.

In step S321, the CPU 101 instructs the communication unit 103 to disconnect the HDMI connection or the DVI connection between the video camera 100 and the TV 200. The CPU 101 executes control so that the video camera 100 does not stop supplying +5 V to the TV 200. If the video camera 100 and the TV 200 are connected by the HDMI connection, the communication unit 103 disconnects the HDMI connection according to the instruction from the CPU 101. Further, if the video camera 100 and the TV 200 are connected by the DVI connection, the communication unit 103 disconnects the DVI connection according to the instruction from the CPU 101.

After the communication unit 103 disconnects the HDMI connection or the DVI connection, the CPU 101 sets the connection flag stored in the memory 102 to [0]. The process then returns to step S301.

As described above, according to the first exemplary embodiment, if the EDID cannot be received from the TV 200 even when the HPD signal is H level (i.e., NO in step S305), the video camera 100 can execute the HPD initialization process and the DDC initialization process. Further, in such a case, the video camera 100 can execute the HPD initialization process and the DDC initialization process without stopping supply of +5 V to the TV 200. As a result, the video camera 100 can speedily reacquire the EDID. Furthermore, if the EDID acquired from the TV 200 is the correct EDID, the video camera 100 can recognize the video format appropriate for the display capability of the TV 200 by referring to the acquired EDID. The video camera 100 can thus transmit the video data appropriate for the display capability of the TV 200 to the TV 200.

Moreover, in the first exemplary embodiment, if the EDID received from the TV 200 is not correct even when the HPD signal is H level (i.e., NO in step S307), the video camera 100 can execute the HPD initialization process and the DDC initialization process. Further, in such a case, the video camera 100 can execute the DDC initialization process without stopping the supply +5 V to the TV 200. As a result, the video camera 100 can more simply and speedily reacquire the EDID. Furthermore, if the EDID acquired from the TV 200 is the correct EDID, the video camera 100 can recognize the video format appropriate for the display capability of the TV 200 by referring to the acquired EDID. The video camera 100 can thus transmit the video data appropriate for the display capability of the TV 200 to the TV 200.

Further, according to the first exemplary embodiment, if the HPD signal is L level, and the EDID cannot be received from the TV 200 (i.e., NO in step S315), the video camera 100 can still also execute the HPD initialization process and the DDC initialization process. In such a case, the video camera 100 can execute the HPD initialization process and the DDC initialization process without stopping supply of +5 V to the TV 200. As a result, the video camera 100 can speedily reacquire the EDID. Furthermore, if the EDID acquired from the TV 200 is the correct EDID, the video camera 100 can recognize the video format appropriate for the display capability of the TV 200 by referring to the acquired EDID. The video camera 100 can thus transmit the video data appropriate for the display capability of the TV 200 to the TV 200.

Moreover, according to the first exemplary embodiment, if the HPD signal is L level, and the EDID received from the TV 200 is not correct (i.e., NO in step S317), the video camera 100 can still execute the HPD initialization process and the DDC initialization process. In such a case, the video camera 100 can execute the HPD initialization process and the DDC initialization process without stopping supply of +5 V to the TV 200. As a result, the video camera 100 can speedily reacquire the EDID. Further, if the EDID acquired from the TV 200 is the correct EDID, the video camera 100 can recognize the video format appropriate for the display capability of the TV 200 by referring to the acquired EDID. The video camera 100 can thus transmit the video data appropriate for the display capability of the TV 200 to the TV 200.

Furthermore, if the correct EDID cannot be received from the TV 200 even when the process of reacquiring the EDID is repeated a predetermined number of times (i.e., YES in step S310), the video camera 100 can connect the DVI connection. As a result, the problem that the video data is not transmitted from the video camera 100 to the TV 200 even when the connection of the HPD line is normal, can be solved.

The communication apparatus described in the first exemplary embodiment can be realized by a single apparatus or a system including a plurality of apparatuses.

The present invention can also be achieved by software (program code) for implementing various processes and functions of the first exemplary embodiment. The software (program code) can be read and executed by a computer (including a CPU) of the system or the apparatus.

Further, an operating system (OS) or the like working on a computer can also be used to realize the various processes and the functions of the first exemplary embodiment.

The computer executes the software (program code) installed from a computer readable storage medium or an external source. If the software (program code) is to be supplied to the computer from a computer readable storage medium, the computer reads out the software (program code) from the computer readable storage medium. The storage medium can be, for example, a hard disk, an optical disk, a compact disc read only memory (CD-ROM), a CD recordable (CD-R), a memory card, or a ROM. If the software (program code) is to be supplied to the computer from an external source, the computer receives the software (program code) from the external source via a communication interface.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-330363 filed Dec. 25, 2008, which is hereby incorporated by reference herein in its entirety.

What is claimed is:

1. A device comprising:
    an acquisition unit that acquires predetermined information from an external device, wherein the predetermined information includes information relating to the external device;
    a determination unit that determines whether or not the external device allows the device to acquire the predetermined information; and
    a control unit that (a) controls the acquisition unit to acquire the predetermined information from the external device if the external device allows the device to acquire the predetermined information, (b) performs a first process for resetting the determination unit if the acquisition unit does not acquire the predetermined information, (c) performs a second process for detecting a predetermined error after the acquisition unit acquires the predetermined information, and (d) performs a third process for resetting the acquisition unit after the predetermined error is detected, wherein the predetermined error includes an error relating to the predetermined information.

2. The device according to claim 1, wherein the predetermined information includes Extended Display Identification Data (EDID) or Enhanced Extended Display Identification Data (E-EDID).

3. A method for controlling a device, wherein the device includes an acquisition unit and a determination unit, the acquisition unit acquires predetermined information from an external device, the determination unit determines whether or not the external device allows the device to acquire predetermined information, and the predetermined information includes information relating to the external device, the method comprising:
- controlling the acquisition unit to acquire the predetermined information from the external device if the external device allows the device to acquire the predetermined information;
- performing a first process for resetting the determination unit if the acquisition unit does not acquire the predetermined information,
- performing a second process for detecting a predetermined error after the acquisition unit acquires the predetermined information, wherein the predetermined error includes an error relating to the predetermined information; and
- performing a third process for resetting the acquisition unit after the predetermined error is detected.

4. The method according to claim 3, wherein the predetermined information includes Extended Display Identification Data (EDID) or Enhanced Extended Display Identification Data (E-EDID).

5. The device according to claim 1, further comprising a transmission unit that transmits data to the external device based on the predetermined information if the predetermined error is not detected.

6. The device according to claim 1, further comprising a calculating unit that calculates a number of times that an acquisition of the predetermined information is performed, wherein the control unit controls the third process based on whether or not the number of times is more than a predetermined value after the predetermined error is detected.

7. The device according to claim 6, wherein the control unit controls the acquisition unit not to perform a process for acquiring the predetermined information from the external device if the number of times is more than the predetermined value.

8. The device according to claim 1, wherein the predetermined information includes information indicating a capability of the external device.

9. The device according to claim 1, wherein the device conforms to HDMI (High Definition Multimedia Interface).

10. The device according to claim 1, wherein the device conforms to DVI (digital visual interface).

11. The device according to claim 1, wherein the device includes one of a video camera, a still camera, a recorder, and a computer.

12. The device according to claim 1, wherein the determining unit determines by using a HPD (Hot Plug Detect) signal whether or not the external device allows the device to acquire the predetermined information.

13. The device according to claim 1, wherein the second process includes a process for determining whether or not the predetermined information satisfies a predetermined format.

14. The device according to claim 1, wherein the second process includes a process for determining whether or not the predetermined information is correct by using a check sum.

15. The device according to claim 1, wherein the second process includes a process for determining whether or not the predetermined information includes an abnormal value.

16. A non-transitory storage medium storing a program executed by for a computer, wherein the program for using the computer to perform a method for controlling a device, wherein the device includes an acquisition unit and a determination unit, the acquisition unit acquires predetermined information from an external device, the determination unit determines whether or not the external device allows the device to acquire the predetermined information, and the predetermined information includes information relating to the external device, the method comprising:
- controlling the acquisition unit to acquire the predetermined information from the external device if the external device allows the device to acquire the predetermined information;
- performing a first process for resetting the determination unit if the acquisition unit does not acquire the predetermined information,
- performing a second process for detecting a predetermined error after the acquisition unit acquires the predetermined information, wherein the predetermined error includes an error relating to the predetermined information; and
- performing a third process for resetting the acquisition unit after the predetermined error is detected.

17. The device according to claim 1, wherein the control unit controls the determination unit to determine whether or not the external device allows the device to acquire the predetermined information after the first process is performed.

18. The device according to claim 1, wherein the control unit controls the acquisition unit to acquire the predetermined information from the external device after the first process is performed.

19. The device according to claim 1, wherein the control unit controls the acquisition unit to acquire the predetermined information from the external device after the third process is performed.

20. The device according to claim 1, wherein the acquisition unit acquires the predetermined information from the external device via a display data channel (DDC) line.

* * * * *